Apr. 24, 1923.
C. H. LA CROIX
1,452,918
INSECT DESTROYER
Filed March 9, 1921
2 Sheets-Sheet 2
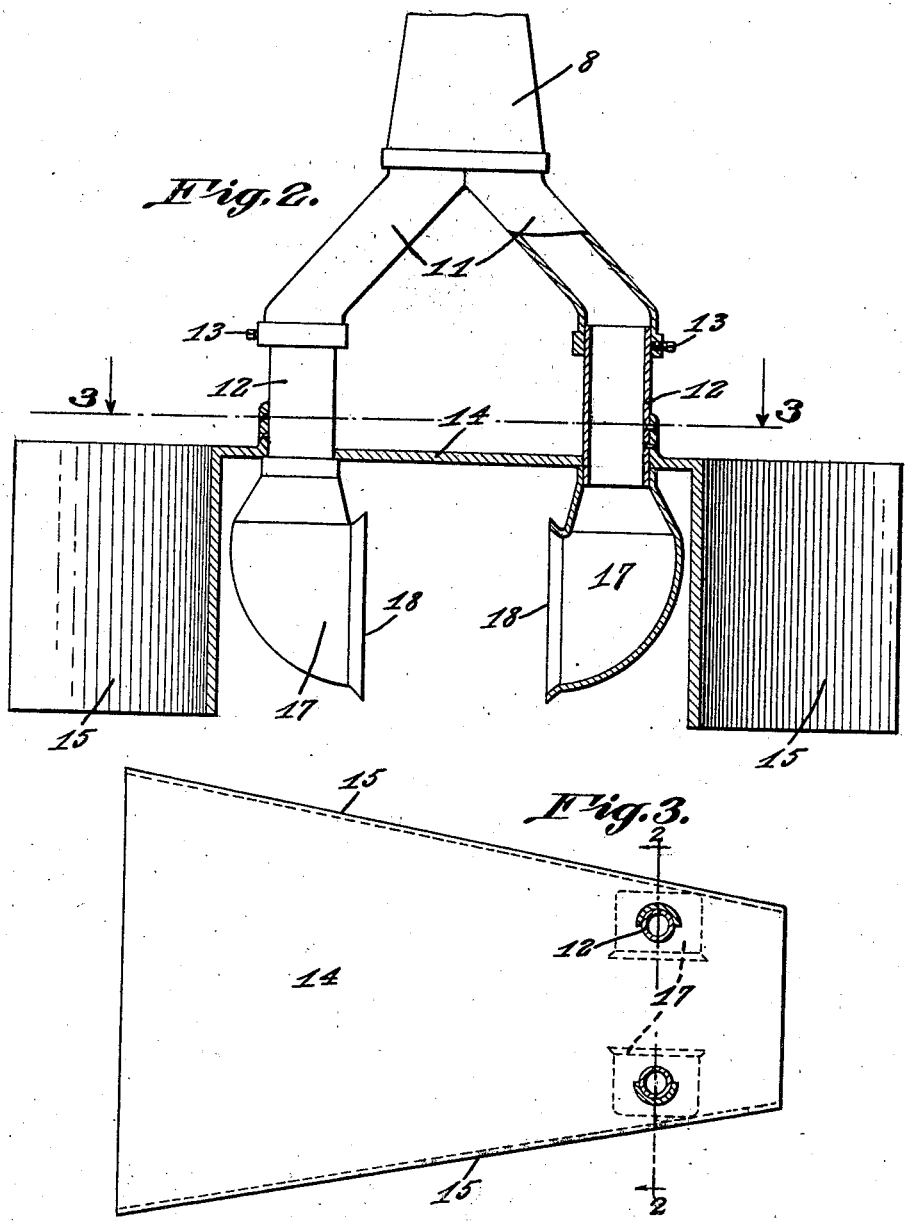
Inventor
C.H. La Croix,
By C.A.Snow&Co.
Attorneys Patented Apr. 24, 1923.

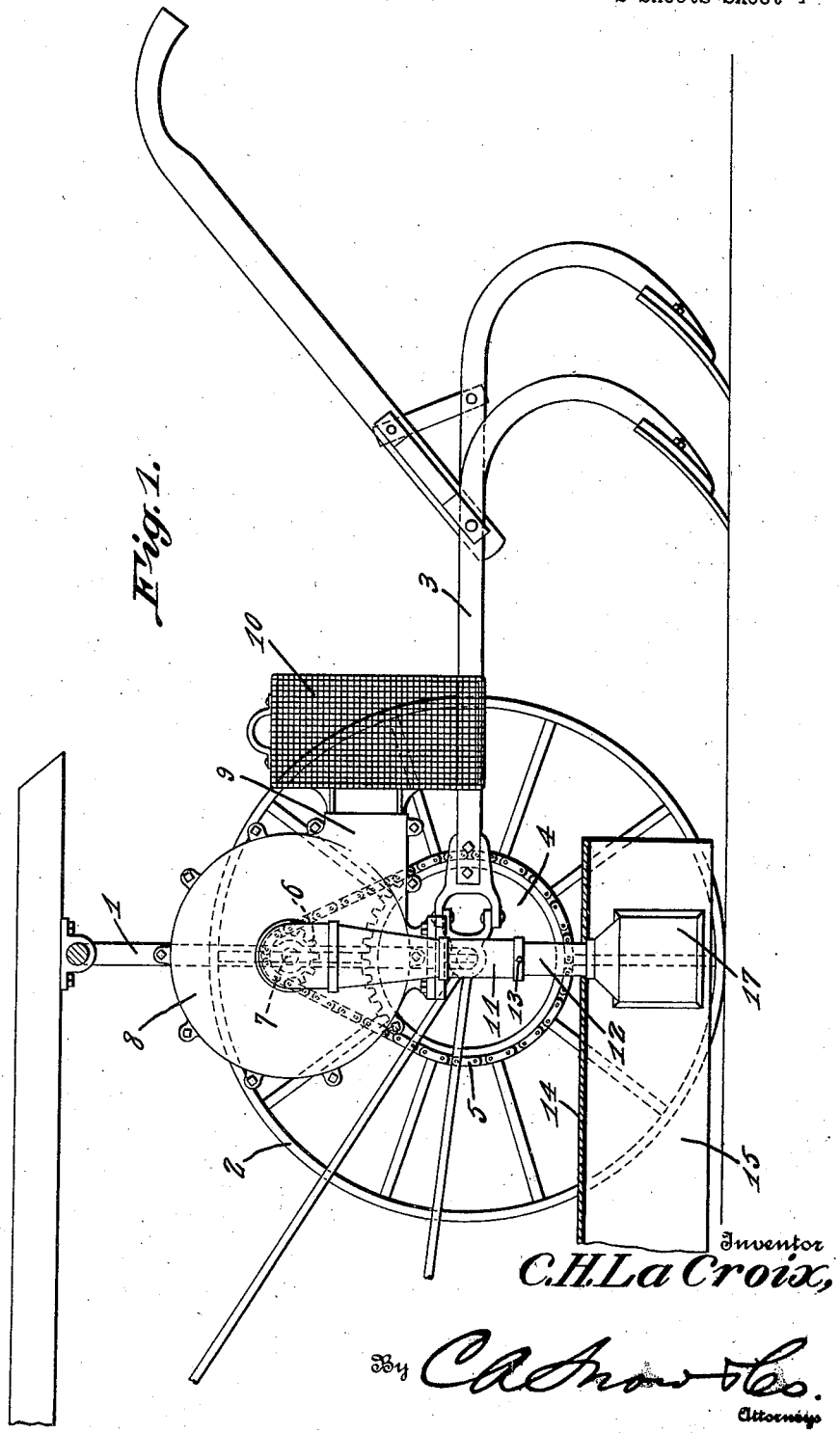

1,452,918

UNITED STATES PATENT OFFICE.

CICERO HAMILTON LA CROIX, OF BANNISTER, TEXAS.

INSECT DESTROYER.

Application filed March 9, 1921. Serial No. 450,986.

*To all whom it may concern:*

Be it known that I, CICERO H. LA CROIX, a citizen of the United States, residing at Bannister, in the county of San Augustine and State of Texas, have invented a new and useful Insect Destroyer, of which the following is a specification.

This invention relates to an insect destroyer, one of its objects being to provide an attachment of this character which can be applied to an ordinary cultivator or to a tractor cultivator.

An object of the invention is to provide a structure which can be built as an attachment capable of being applied readily to machines already in use, the said structure including a suction fan connected to intake nozzles which are disposed within a hood designed to extend over the plant acted on, thereby to insure collection of the insects so that they cannot get out of the line of suction but will be collected and drawn into the machine and then discharged into a container provided therefor.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a vertical longitudinal section through a cultivator having the present improvements combined therewith, certain parts being shown in full.

Figure 2 is a view partly in front elevation and partly in transverse section through the collecting means.

Figure 3 is a plan view of the hood portion of the collecting device, the flues opening thereinto being shown in section.

Referring to the figures by characters of reference 1 designates the arched axle of a cultivator, one of the supporting wheels being indicated at 2 while the cultivator beam has been shown at 3. A sprocket 4 can be mounted to rotate with one of the wheels 2 and serves to drive a chain 5 whereby motion is transmitted to a sprocket 6 on the shaft 7 of a suction fan located within a casing 8. This casing has an outlet 9 discharging into a foraminous receiver 10 supported in any suitable manner being shown carried by the fan casing.

Opening into the casing or housing 8 are intake flues 11, which preferably diverge downwardly and have telescopic extensions 12 adjustably mounted therein and secured by means of set screws 13 or in any other suitable manner. The lower ends of these extensions project through and are secured to the top of an elongated hood 14 open at the bottom and at the front and back and provided with depending side walls 15. The hood has its side walls converging rearwardly so that the open front end thereof is of greater area than the rear end. Connected to the lower ends of the flue extensions 12 are oppositely disposed receiving heads 17 having open faces 18 disposed substantially in parallel relation and spaced apart so as to travel along opposite sides of a row of plants over which the hood 14 is extended.

When the machine is moved forwardly the hood 14 will pass over the plants to be treated and thus form a trap for the insects that may be disturbed, preventing them from getting out of the line of suction which is set up through the hood from the open ends thereof and from the bottom to the heads 17. This suction is of course created by the fan within the housing 8. The insects are drawn through the flue extensions 12 and the flues 11 to the housing 8 and are then expelled into the receiver 10 after which they can be destroyed in any manner desired.

By providing this structure as an attachment for a cultivator it will be obvious that the act of removing and destroying the insects can be carried on during the cultivation of the plants. While the attachment has been shown applied to an ordinary cultivator it is to be understood that it can be mounted on a tractor and the fan instead of being driven by one of the ground engaging wheels can be operated by the motor of the tractor. Such an arrangement is so obvious that a detailed illustration thereof is not deemed necessary.

Obviously by means of the extensions 12 and the connections 13 the hood 14 and the heads thereunder can be adjusted upwardly or downwardly relative to the surface of the ground.

The hood 14 can be proportioned so as to straddle either one row or two rows. In the latter event both rows will pass between the heads 17, the suction being sufficient to remove the dislodged insects.

What is claimed is:—

1. An insect destroying attachment for cultivators and the like comprising a hood open at its front, rear and bottom and increasing in area toward its front end, oppositely disposed suction heads within the hood near its rear end, said heads being arranged adjacent the sides of the hood and facing each other, a foraminous receiver, and means for creating suction through the hood and heads and directing the air currents into the receiver.

2. An insect attachment for cultivators and the like comprising an insect receiver, a fan casing connected therewith, downwardly diverging intake flues depending from said casing, telescopic extensions adjustably mounted in said flues, a horizontally disposed elongated hood open at its bottom, front and rear, with its side walls diverging toward the front, said flue extensions projecting through the top of said hood and fixed thereto, oppositely disposed receiving heads carried by the lower ends of said flue extensions and having open mouths facing each other spaced apart to travel along opposite sides of a row of plants over which the hood is extended.

In testimony that I claim the foregoing as my own, I have hereto affixed my signature in the presence of two witnesses.

CICERO HAMILTON LA CROIX.

Witnesses:
 IRA DAVIS,
 G. W. GRAY.